US007621985B1

(12) United States Patent
Kuo (10) Patent No.: US 7,621,985 B1
(45) Date of Patent: Nov. 24, 2009

(54) PLASMA TORCH IMPLEMENTED AIR PURIFIER

(75) Inventor: Spencer P. Kuo, River Edge, NJ (US)

(73) Assignee: Adventix Technologies Inc., River Edge, NJ (US)

( * ) Notice: Subject to any disclaimer, the term of this patent is extended or adjusted under 35 U.S.C. 154(b) by 7 days.

(21) Appl. No.: 12/126,869

(22) Filed: May 24, 2008

(51) Int. Cl.
*B03C 3/019* (2006.01)
(52) U.S. Cl. .................. 96/55; 95/70; 95/73; 96/63; 96/223; 96/225; 219/121.49; 219/121.51; 219/121.52; 422/22; 422/121
(58) Field of Classification Search .............. 96/2, 96/3, 55, 63, 223, 225; 422/22, 121; 219/121.49, 219/121.51, 121.52; 95/69, 70, 73
See application file for complete search history.

(56) References Cited

U.S. PATENT DOCUMENTS

| 4,275,287 | A | * | 6/1981 | Hiratake | 219/121.52 |
|---|---|---|---|---|---|
| 5,144,110 | A | * | 9/1992 | Marantz et al. | 219/121.48 |
| 5,147,998 | A | * | 9/1992 | Tsantrizos et al. | 219/121.5 |
| 6,329,628 | B1 | * | 12/2001 | Kuo et al. | 219/121.54 |
| 6,524,538 | B2 | * | 2/2003 | Barankova et al. | 422/186.04 |
| 6,719,909 | B2 | * | 4/2004 | Ohkawa | 210/695 |
| 6,797,176 | B1 | * | 9/2004 | Ohkawa | 210/695 |
| 7,091,441 | B1 | * | 8/2006 | Kuo | 219/121.36 |
| 7,132,010 | B2 | * | 11/2006 | Carlsson | 96/55 |
| 7,156,897 | B2 | * | 1/2007 | Wen | 95/28 |
| 2006/0175302 | A1 | * | 8/2006 | Kuo | 219/121.36 |
| 2007/0193448 | A1 | * | 8/2007 | Tanaka et al. | 96/18 |
| 2007/0266855 | A1 | * | 11/2007 | Fleisher | 96/16 |
| 2008/0173621 | A1 | * | 7/2008 | Kuo | 219/121.48 |
| 2008/0193329 | A1 | * | 8/2008 | Akishev et al. | 422/22 |

FOREIGN PATENT DOCUMENTS

JP           5-41292 A   *   2/1993

* cited by examiner

*Primary Examiner*—Richard L Chiesa (57) ABSTRACT

An air purifier to improve air quality for breathing is disclosed. A magnetized torch module that passes a large air flow is designed. The emission spectroscopy of the torch indicates that the plasma effluent carries an abundance of reactive atomic oxygen (RAO), which can effectively kill all kinds of microbes. The invention employs two torch modules which run alternately to generate non-thermal plasma for air treatment via both thermal/non-thermal processes. The air flow through the on-torch module is mainly treated thermally. A controlling air valve is designed to direct the exiting airflow of the off-torch module to pass through the plasma torch of the on-torch module for non-thermal treatment. The controlling air valve also works to turn the torch modules on and off synchronizing with the closing and opening of the two air valves in the controlling air valve. This device purifies ambient air in a fast rate and kills microbes thoroughly. This invention is suitable for applications such as a household air purifier, integrating it to a building HVAC system, and a hospital air disinfector and maintaining the air quality of the clean rooms.

5 Claims, 8 Drawing Sheets

PLASMA TORCH IMPLEMENTED AIR PURIFIER

§ 1. BACKGROUND OF THE INVENTION

§ 1.1 Field of the Invention

The present invention generally concerns the design of an air purifier using plasma torches to carry out sterilization. It involves the design of a new magnetized torch module and a controlling air valve. Two torches are run alternatively to eliminate the cooling requirement; the controlling air valve guides the airflow from the off-torch module to pass through the torch of the on-torch module. The plasma effluent of the torch carries abundant atomic oxygen, which can effectively kill all kind of microbes. Therefore, the airflows through both torch modules are treated even though there is only one torch used at any time. Application of the device is for purifying as well as sterilizing air.

§ 1.2 Background

Figure 1:
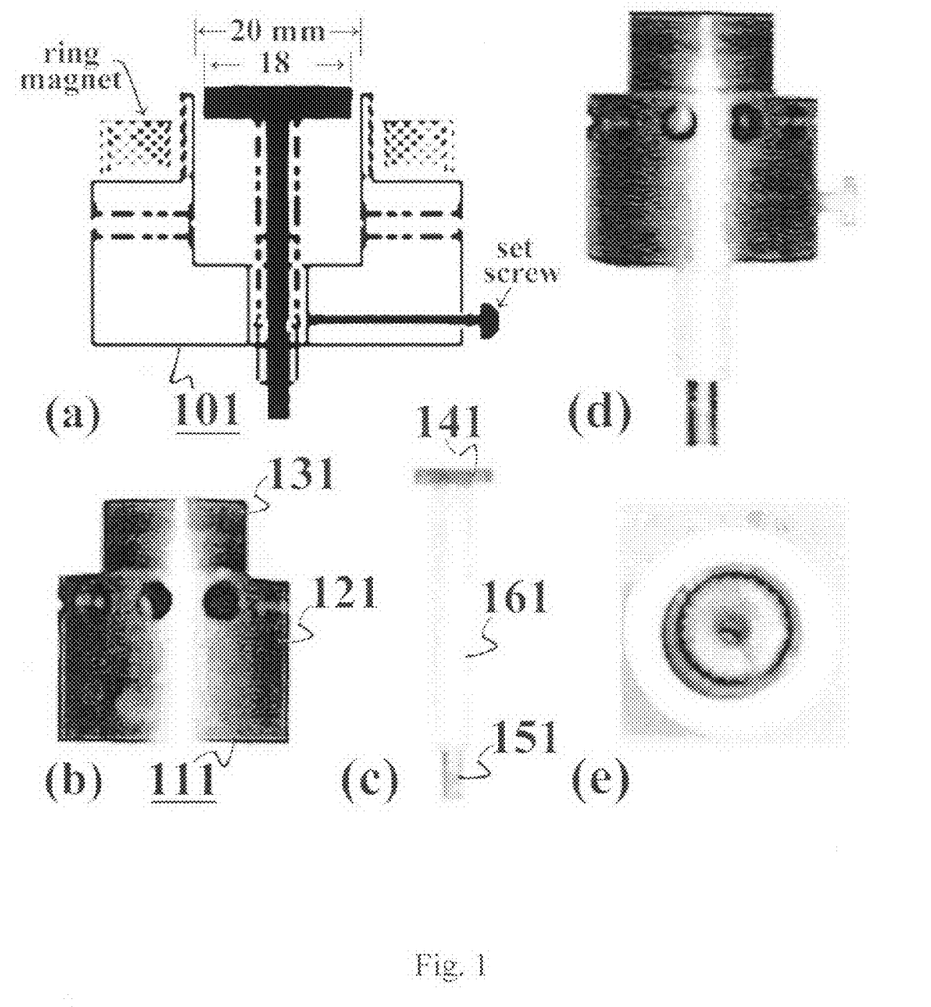
FIG. 1 include (a) a schematic of a magnetized torch module, (b) photo of the module frame, (c) photo of the central electrode, (d) side view of the module (without the magnet), and (e) top view of the module (without the magnet).

A torch module described in the article S. P. Kuo, et al., "Design and electrical characteristics of a modular plasma torch," *IEEE Trans. Plasma Sci*. Vol. 27, no. 3, pp. 752-758, June, 1999, New Jersey; and in the U.S. Patent S. P. Kuo, et al., U.S. Pat. No. 6,329,628, "Methods and Apparatus for Generating a Plasma Torch," December 2001, ("the '628 patent") produces a plasma torch via arc discharge, which is stabilized by introducing a flow through the discharge. The torch module can be run in low frequency (e.g., 60 Hz) periodic mode to produce low temperature non-equilibrium air plasma. The required discharge voltage is proportional to the gap between the two (concentric) electrodes. Thus the gap is usually small. The gas flow rate through the gap is proportional to the cross sectional area of the ring-shaped gap, which is the product of the gap and the periphery length of the ring gap. The periphery length of the ring gap can be increased by increasing the radial size of the torch module. A torch module is designed with the inner diameter of the outer electrode to be 20 mm. The central electrode is a spline copper disk with a diameter of 18 mm, i.e., the side surface of the disk is carved with grooves. The spline structure improves the performance of the discharge and increases the airflow for a fixed gap. A schematic of the torch module is presented in FIG. 1, in which photos of the torch frame (b), central electrode (c), and side view (d) and top view (e) of the module are also shown. An air purifier employing two torch modules, running alternately to generate plasma for air treatment, is devised. In the device a synchronous controlling air valve is designed so that the airflows through the two torch modules are always treated by the torch, one in the torch and the other one crossing the plasma effluent of the torch.

The advantages of using two torches and running alternately are 1) eliminating the cooling requirement of the torch module and 2) doubling the airflow rate and thus the air treating rate.

The torch in the device produces non-equilibrium plasma, which has a good usage of the electron plasma energy, gained from the discharge, to produce reactive oxygen species (ROS), rather than to heat the airflow. ROS (particularly, the reactive atomic oxygen (RAO)) are effective in killing microorganisms including the toughest biological agents, bacterial spores, such as Anthrax (See, e.g., the articles: H. W. Herrmann et al., "Decontamination of chemical and biological warfare (CBW) agents using an atmospheric pressure plasma jet (APPJ)," *Phys. Plasma*, Vol. 6, pp. 2284-2289, May 1999, New York (hereafter referred to as "the Herrmann article"); and Wilson Lai et al., "Decontamination of Biological Warfare Agents by a Microwave Plasma Torch", *Phys. Plasmas*, Vol. 12, 023501 (1-6), February 2005, New York (hereafter referred to as "the Lai article")).

§ 2. SUMMARY OF THE INVENTION

Normally, an air purifier uses filter(s) to remove dust and/or microorganisms from the airflow. The filter does not kill the microorganisms, thus the handling of the filter, either cleaning or replacing, needs care.

Figure 2:
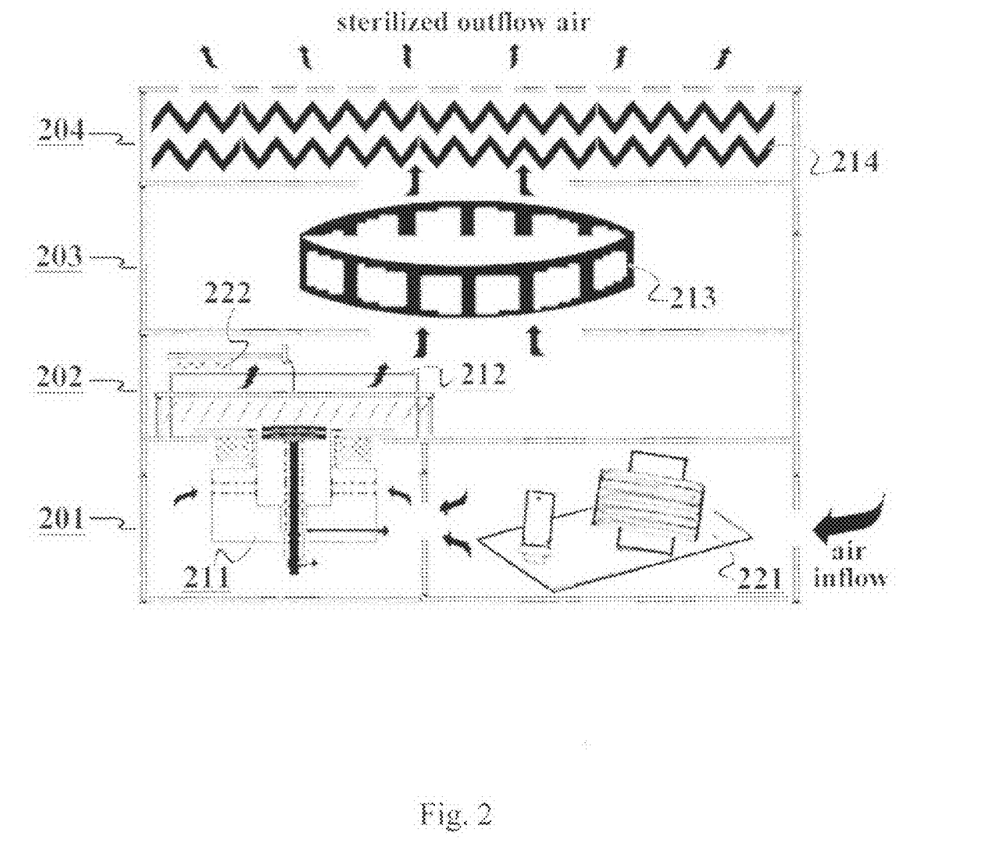
FIG. 2 is a layout of the invention.
Figure 3:
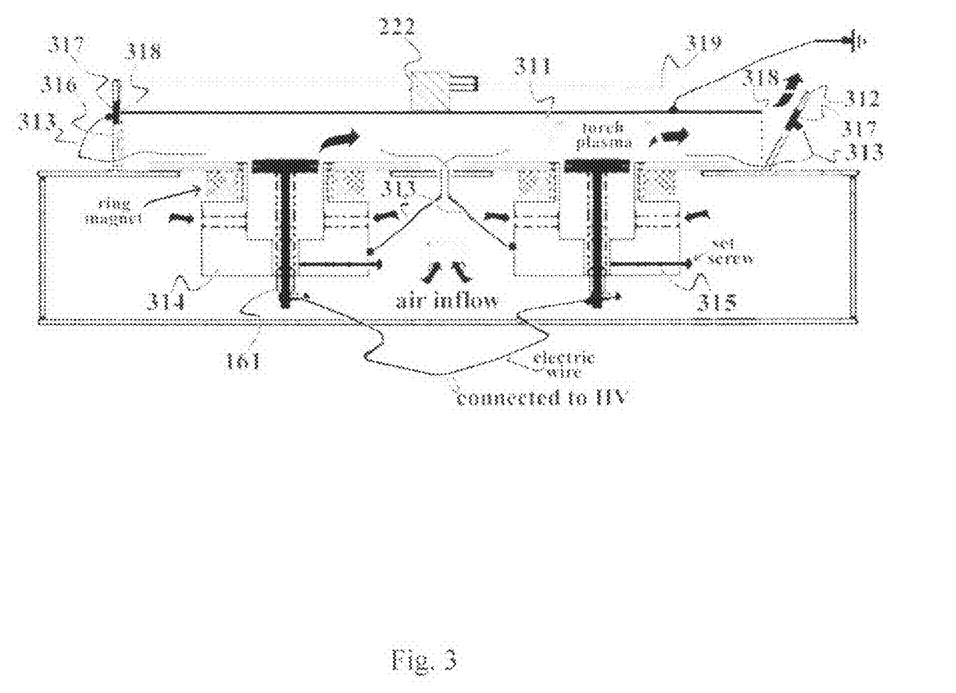
FIG. 3 is a detail schematic and arrangement of a pair of torch modules covered by a controlling air valve.
Figure 4A:
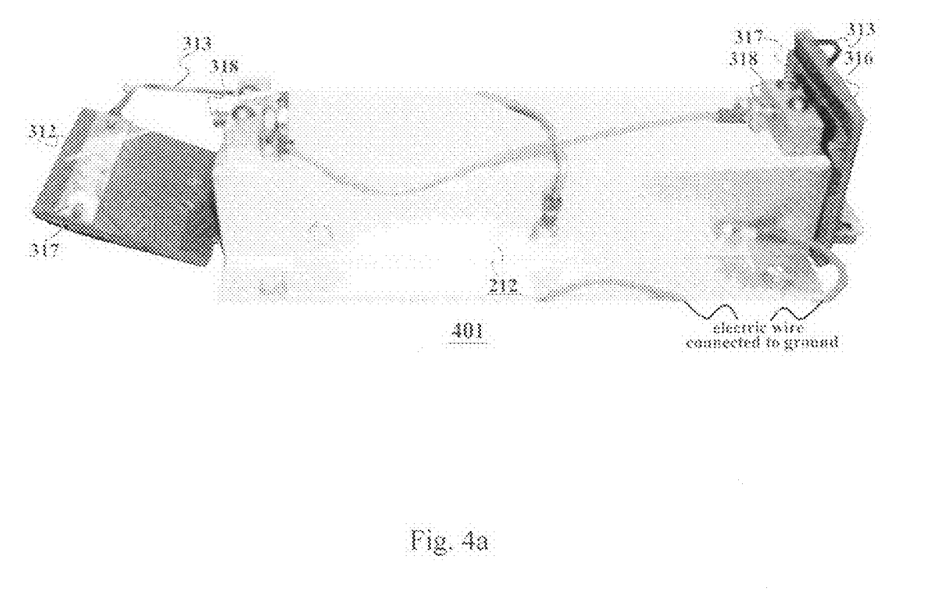
FIGS. 4a to c are photos of the controlling air valves showing an air channel, two air valves, a pull linear solenoid, a synchronous AC gearmotor, a push-pull switch, and electric connections.
Figure 4B:
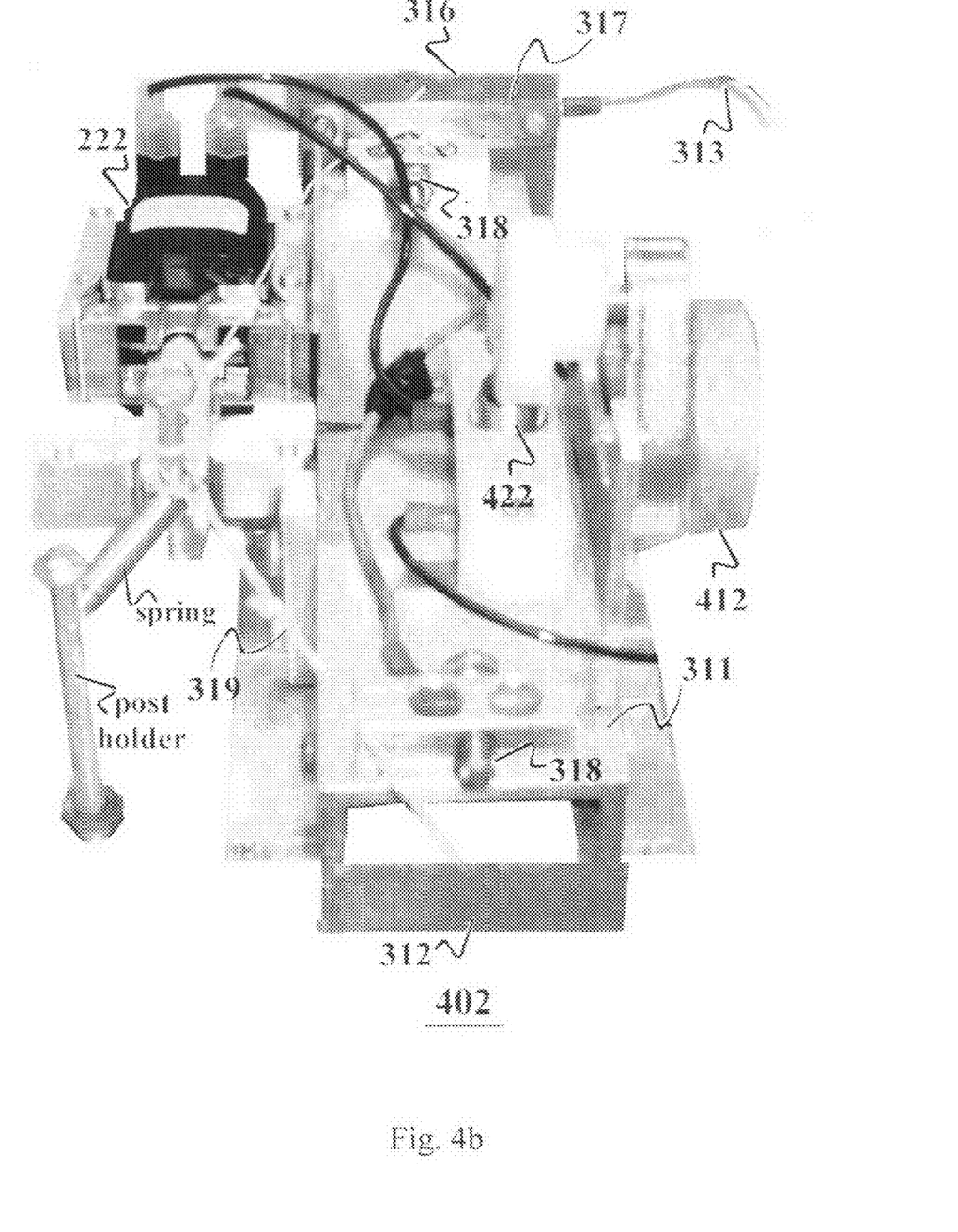
Figure 4C:
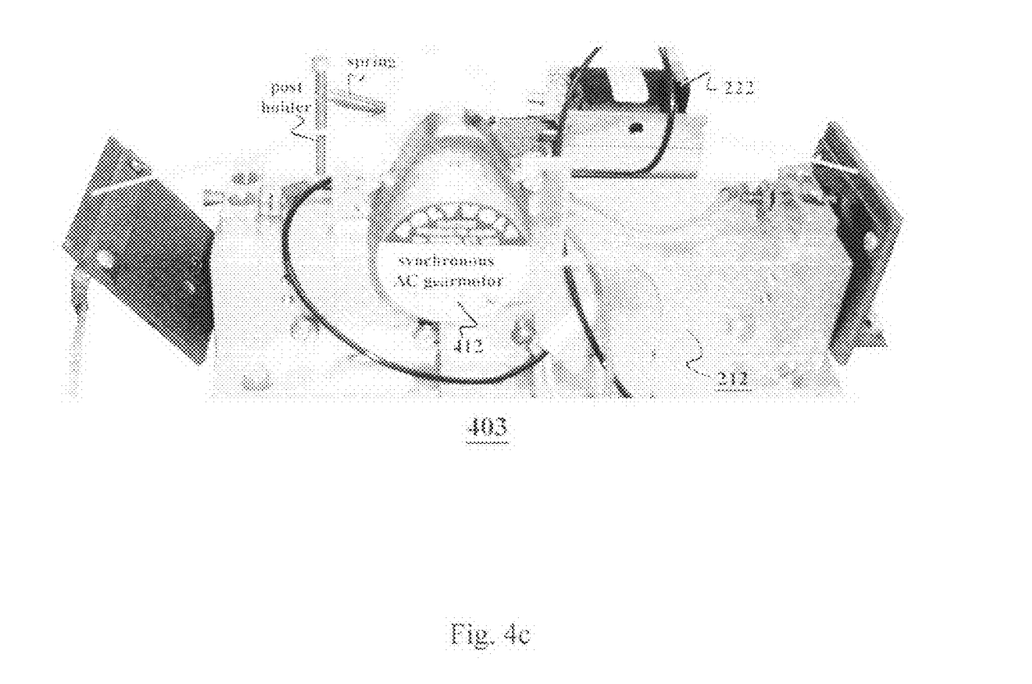

A new air purifier is devised; it kills microorganisms thoroughly, thus the filter of the device, collecting the dust and dead microorganisms, is not contaminated. A drawing of the system is presented in FIG. 2. As shown, this device has four decks. From the bottom up, the first one contains a pair of torch modules and the power supply. It has an air inlet at the side of the power supply so that the air inflow can cool the power supply before flowing through the torch modules. FIG. 3 presents a detail schematic of the module pair. As shown, the torch modules are covered by a controlling air valve, which is hosted in the next deck. This controlling air valve works to guide the airflows exiting the torch modules and has an air channel and two valves at the two ends to control the flow direction in the air channel. A picture of this controlling air valve is shown in FIG. 4*a*. The air channel is electrically grounded. The two valves, which are connected to the ground wires of the two torch modules, are electrically insulated from the air channel when they are in open positions and electrically connect to the air channel when they are in close position. As the two valves are closing and opening alternately by a "pull linear solenoid", mounted on a sidewall of the air channel as shown in FIGS. 4*b* and 4*c*, they control the on-off of the two torches by closing and opening the ground connections. For example, as shown in FIG. 3, the valve on the left hand side (LHS) is closed; the ground wire of the right hand side (RHS) torch module is in electric contact with the air channel so this torch module is running. The other valve on the RHS is open. Thus, the airflow through the off-torch module on the LHS is forced to flow to the right, which is treated by passing through the plasma torch generated by the torch module on the RHS. The electric switch of the solenoid is mounted on the top wall of the air channel. As shown in FIGS. 4*b* and 4*c*, a timer made of a "synchronous AC gearmotor", mounted on the other sidewall of the air channel, is used to turn this "push-pull switch" on/off mechanically in a set time interval (determined by the RPM of the motor). Third deck hosts a centrifugal fan, which blows the treated air exiting from the air channel in the second deck to an air filter contained in the top deck. The treated air returns to the ambient after it passes through the filter.

Figure 5:
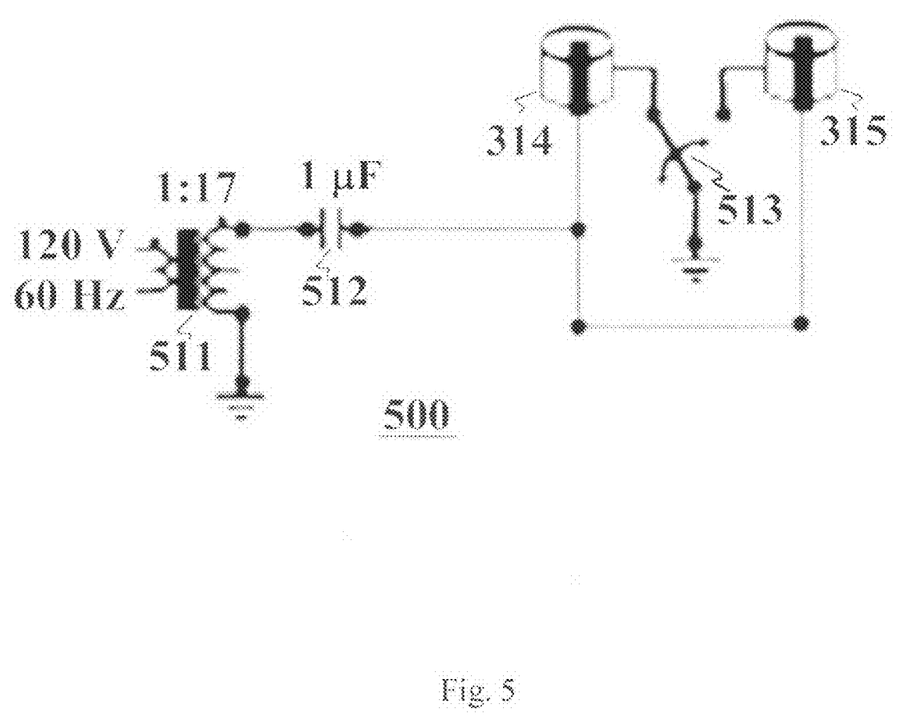
FIG. 5 is the circuitry of the power supply.

The present invention uses a power supply having a circuitry shown in FIG. 5 that is simple and is adaptable to a number of AC power sources, such as 60 Hz (or 50 Hz) voltage available at most common wall outlets. The turns ratio 1:17 is based on 120 V input. It should be reduced to 1:9 when the input is 220 V.

§ 4. DETAILED DESCRIPTION

The present invention involves a novel design of a plasma torch implemented air purifier, which uses arc discharge as well as the plasma effluent of a plasma torch to decontaminate biological and chemical agents in the air. The arc discharge kills microorganisms directly, and the reactive atomic oxygen (RAO) produced in the plasma effluent works to kill microbes and to neutralize chemical compounds via oxidation. The following description is presented to enable one skilled in the art to make and use the invention, and is provided in the context of a particular application and its requirement. Various modifications to the disclosed embodiments will be apparent to those skilled in the art, and the general principles set forth below may be applied to other embodiments and applications. Thus, the present invention is not intended to be limited to the embodiments shown.

In the following, functions, which may be performed by the present invention, are introduced in § 4.1. Then, structures of the apparatus built in accordance with the present invention are described in § 4.2. Application of the invention is described in § 4.3. Thereafter, operations of the apparatus are described in § 4.4. Finally, conclusions about the present invention are presented in § 4.5.

§ 4.1 FUNCTIONS

The present invention is used to cleanse air for safe and quality air inhalation. The plasma torch in the device produces abundant RAO in the plasma effluent. RAO can effectively kill all kind of microbes and neutralize chemical compounds. Moreover, the microbes in the airflow passing through the running torch module will be killed directly by the arc discharge and its heat. The dust and chemical compounds in the air will be removed by combustion, neutralization, as well as the filter in the last stage. The torch also produces healthy gas such as Nitric oxide (NO) (See, e.g., the articles: S. P. Kuo et al., "Operational Characteristics of a Periodic Plasma Torch", *IEEE Trans. Plasma Sci*., Vol. 32, pp. 262-268, February 2004, New Jersey (hereafter referred to as "the Kuo article")). Nitric oxide protects the heart, stimulates the brain, kills bacteria, etc as stated on the Press Release by the Nobel Assembly at Karolinska Institutet on Oct. 12, 1998.

§ 4.2 STRUCTURES

The torch modules used in this device, each one (101), as shown in FIG. 1*a*, has two major components: a plenum chamber (111) shown in FIG. 1*b*, which is the frame (121) and outer electrode (131) of the module, and a central electrode shown in FIG. 1*c*, which is a spline copper disk (141) held by a conducting rod (151) and positioned centrally by a ceramic tube (161). These two components can be easily assembled; FIG. 1*d* and FIG. 1*e* are the side view and top view of an assembled one.

In the following, the air purifier based on the system layout presented in FIG. 2 is described. The components of the system are also described with the aid of additional figures.

This device as layout in FIG. 2 consists of four parts which are contained in four decks (201, 202, 203, 204) stacked together. In the lowest deck, (201) the torch modules (211) and the power supply (221) are placed. The two torch modules (211) are held on an insulating plate, which keeps those two electrically insulated. As shown, this deck has an air inlet located next to the power supply. Thus the inflowing air passes the power supply (221) first to cool it before flowing through the torch modules (211). The two torch modules are turned on alternately, but the airflows pass through the two modules continuously. The airflow through an off torch module is not treated, but it works to cool the torch module. A controlling air valve (212) is introduced in the second deck (202) to guide the untreated airflow exiting from the off torch module to pass through the plasma torch produced by the on torch module. This controlling air valve (212) consists of an air channel and two air valves at two ends controlled by a pull linear solenoid (222) to open and close them alternately. A centrifugal fan (213) is placed in the third deck (203). This fan drives the airflow. It sucks the air in through the air inlet at the bottom deck and blows the treated air through the air filter (214) in the top deck (204) to the vent.

Presented in FIG. 3 is a side view of the two lower decks (201, 202) of the device, showing the schematics of the modules (211), the controlling air valve (212), the pull linear solenoid (222) and the layout of their assembly. In the controlling air valve (212), the air channel (311) is made of a conducting plate. The air valve is a piece of insulating plate attached with a conducting stripe (317) for providing positioned electric contact (318) with the air channel (311). The electric switch of the solenoid and its controlling timer (a synchronous gearmotor) are not shown. This controlling air valve also represents the electric switch (513) in FIG. 5. The ground wire (313) of each torch module is connected to the valve (312) or (316) on the opposite side as shown in FIG. 3. For example, when the linear solenoid (222) pulls the valve (316), through a connected cord (319) to make electric contact (318) with the air channel (311), the torch module (315) on the opposite side will be turned on. On the other hand, the valve (312) will be in open position, being electrically insulated from the air channel (311); thus the corresponding torch module (314) will be turned off. In other words, the on-off of the torch modules (315, 314) are controlled by the closing and opening of the air valves (316, 312), and therefore, are synchronous with the desirable airflow direction in the air channel (311).

FIG. 4*a* is a photo of the controlling air valve (212). The action of the air valves (312, 316) is controlled by a pull linear solenoid (222) shown in FIG. 4*b*, which turns on and off at a set time period (e.g., 30 s) of a timer mounted to the sidewall of the air channel (311). This timer (also shown in FIG. 4*b*), a synchronous AC gearmotor (412), turns a push-pull switch (422), which is connected to the electric line of the solenoid, on/off mechanically. FIG. 4*c* is a side view of the components presented in FIG. 4*b*.

The power supply (221) of the present invention has a circuitry (500) shown in FIG. 5 that is simple and is adaptable to a number of AC power sources, such as 60 Hz (or 50 Hz) voltage available at most common wall outlets. This power supply employs a single power transformer (511) with a turn ratio of 1:17 to step up line voltage of 120 V (rms) to 2 kV (rms), i.e., a peak voltage of 2.83 kV. The output of the transformer is connected to a 1 μF capacitor (512), which is then connected to the central electrodes of the two torch modules (314, 315). A switch (513) is connected to the ground wires of the two torch modules to alternate the on-off of the torch modules, which is synchronous with the closing and opening of the air valves. As shown on the right hand side of the lowest deck (201) in FIG. 2, the power supply (221) is placed near an air inlet so that the air inflow can effectively cool it.

§

4.3 APPLICATION OF THE INVENTION

§ 4.3.1 Air Purification and Disinfection

A device made in accordance with the present invention, such as that described in § 4.2, may be used to clean ambient air for safe and healthy breathing. It removes dust through combustion and filtering, destroys disease-carrying microorganisms through discharge, torch burning and oxidation (by the produced atomic oxygen), neutralizes chemical compounds through oxidation, and produces healthy gas, such as Nitric oxide (NO), for inhalation.

§ 4.3.2 Applications

Some of the applications of the device made in accordance with the present invention, such as that described in § 4.2, include 1) for household air sterilizer/purifier, 2) integrating to building HVAC system, and 3) to use in hospital and maintaining the air quality of the clean rooms.

§ 4.4 OPERATIONS OF AN EXEMPLARY EMBODIMENT

Figure 6:
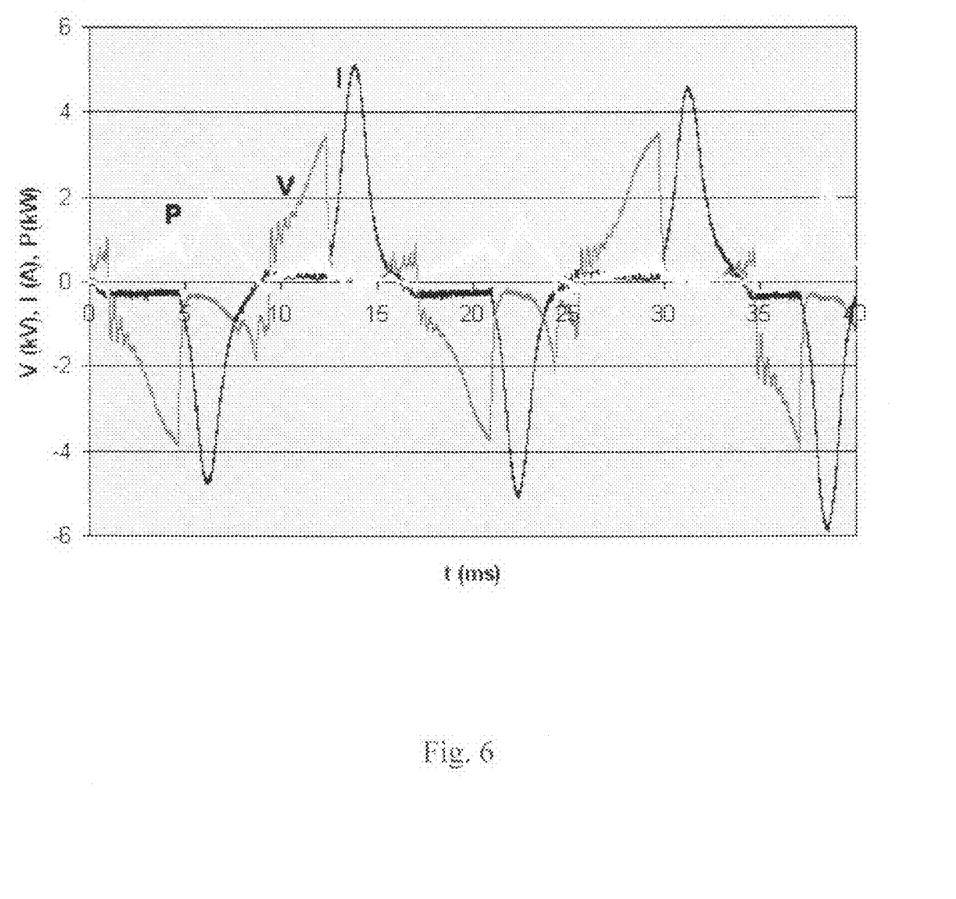
FIG. 6 presents the voltage (V), current (I), and power (P) functions of the discharge.

An exemplary air purifier such as that described in § 4.2 above, may plug its power cord to a standard household 120 V wall outlet. The voltage (V), current (I), and power (P) functions of the discharge in a running torch are shown in FIG. 6. The breakdown voltage of the arc discharge is about 3 kV and the peak arc current is less than 5 A. The peak power is less than 2 kW, and the average power is about 400 W, which is well below the rating 1.8 kW of a household 15 A circuit breaker. The two torches may be run at 30 seconds on-off alternately (using a 1 RPM synchronous AC gearmotor as the timer). With the available fan and its speed, this device may purify air at a rate of about 600 liters per minute.

§ 4.5 CONCLUSIONS

A torch module that passes a large airflow and produces abundant reactive atomic oxygen in the plasma effluent of the torch is designed. The invention using two such torch modules in its operation can thoroughly purify and disinfect ambient air via both thermal/non-thermal (via RAO) processes. Because the filter of the device is not contaminated, it is safe to replace the filter. The performance test of a prototype has been conducted. The results show that the device can treat the ambient air at a rate of about 600 liters per minute and consumes moderate power of about 500 W (400 W+100 W loss in the transformer).

Such an air purifier device may be constructed from available commercial parts, such as the fan, filter, servo motor and its control electronics, and components of the power supply, together with custom designed components, the torch modules and controlling air valve, described in § 4.2.

REFERENCES

S. P. Kuo, et al., "Design and electrical characteristics of a modular plasma torch," *IEEE Trans. Plasma Sci.*, Vol. 27, no. 3, pp. 752-758, June, 1999, New Jersey.

S. P. Kuo, et al., "Methods and Apparatus for Generating a Plasma Torch," U.S. Pat. No. 6,329,628, December 2001.

H. W. Herrmann et al., "Decontamination of chemical and biological warfare (CBW) agents using an atmospheric pressure plasma jet (APPJ)," *Phys. Plasma*, Vol. 6, pp. 2284-2289, May 1999, New York.

Wilson Lai et al., "Decontamination of Biological Warfare Agents by a Microwave Plasma Torch", *Phys. Plasmas*, Vol. 12, 023501 (1-6), February 2005, New York.

S. P. Kuo et al., "Operational Characteristics of a Periodic Plasma Torch", *IEEE Trans. Plasma Sci.*, Vol. 32, pp. 262-268, February 2004, New Jersey.

What is claimed is:

1. An apparatus to purify and disinfect ambient air for safe and healthy breathing, the apparatus comprising:
   a) A pair of magnetized torch modules;
   b) A controlling air valve to guide the airflow for the treatment and to turn the torch modules on-off alternately;
   c) A power supply to drive the torch modules;
   d) A centrifugal fan to supply airflow to said torch modules, to blow the treated air through a filter back to the ambient, and to cool said power supply;
   e) A filter to collect any remaining dust and dead microorganisms in the treated airflow.

2. The apparatus of claim 1, wherein said magnetized torch module includes a cylindrical frame, a central electrode, a tubular ceramic insulator, and a ring-shaped permanent magnet; the cylindrical frame serves as the outer electrode and a gas plenum chamber, and also holds the ring magnet; the central electrode is a spline copper disk held by a conducting rod, which is used for external electric connection and is inserted through a ceramic tube along the axis of said cylindrical module frame for centering.

3. The apparatus of claim 1, wherein said two torch modules are run alternately by a single power supply; the on-off of the torch modules is synchronous with the closing and opening of the air valves of said controlling air valve, which directs the exiting airflows of the torch modules.

4. The apparatus of claim 1, wherein the torch module produces an abundance of reactive atomic oxygen in its plasma effluent and can thoroughly purify and disinfect ambient air via both thermal/non-thermal (via RAO) processes.

5. The apparatus of claim 3, wherein primary input power of the power supply is selected from a 60 Hz/120V (rms) AC power source, wherein the time average power of approximately 500 W is consumed.

* * * * *